(12) United States Patent
Hou

(10) Patent No.: US 6,830,168 B2
(45) Date of Patent: Dec. 14, 2004

(54) ARTICLE CARRIER FOR BABY CARRIAGE

(75) Inventor: Jen-En Hou, Chia-I Hsien (TW)

(73) Assignee: Link Treasure Limited, Tortola (VG)

( * ) Notice: Subject to any disclaimer, the term of this patent is extended or adjusted under 35 U.S.C. 154(b) by 89 days.

(21) Appl. No.: 10/414,220

(22) Filed: Apr. 16, 2003

(65) Prior Publication Data

US 2003/0192928 A1 Oct. 16, 2003

(30) Foreign Application Priority Data

Apr. 16, 2002 (TW) ........................................ 91205075 U

(51) Int. Cl.[7] .............................................. B60R 7/00
(52) U.S. Cl. ...................... 224/409; 224/549; 224/563; 280/47.38; 280/650
(58) Field of Search ............................... 224/407, 409, 224/437, 439, 549, 563; 280/47.38, 642, 647, 650

(56) References Cited

U.S. PATENT DOCUMENTS

| | | | | |
|---|---|---|---|---|
| 4,066,196 A | * | 1/1978 | Jackson et al. ............. | 224/431 |
| 4,260,086 A | * | 4/1981 | Hine et al. ................... | 224/438 |
| 4,953,887 A | * | 9/1990 | Takahashi et al. .......... | 280/647 |
| 5,447,354 A | * | 9/1995 | Delp ........................... | 296/104 |
| 5,454,584 A | * | 10/1995 | Haut et al. .................. | 280/642 |
| 5,741,021 A | * | 4/1998 | Saint et al. .............. | 280/47.38 |
| 5,803,328 A | * | 9/1998 | Nakahara ..................... | 224/420 |
| 6,029,875 A | * | 2/2000 | Johnston ..................... | 224/417 |
| 6,152,340 A | * | 11/2000 | Chen et al. .................. | 224/409 |
| 6,241,273 B1 | * | 6/2001 | Gehr ........................... | 280/642 |

* cited by examiner

Primary Examiner—Stephen K. Cronin
(74) Attorney, Agent, or Firm—Birch, Stewart, Kolasch & Birch, LLP.

(57) ABSTRACT

An article carrier for a baby carriage, suspended at a lower side of a carriage frame, includes a carrier body, a pair of support rods and a cover sheet. The cover sheet is movably mounted to the article carrier via the support rods so as to be able to retract or deploy to uncover or cover and shield the article carrier. When the cover sheet is deployed, the articles in the article carrier are prevented from dropping on the ground. When the cover sheet is retracted, it is easy for the user to access the articles in the article carrier.

4 Claims, 5 Drawing Sheets

ARTICLE CARRIER FOR BABY CARRIAGE

This nonprovisional application claims priority under 35 U.S.C. § 119(a) on Patent Application No(s). 091205075 filed in TAIWAN, R.O.C. on Apr. 16, 2002, which is (are) herein incorporated by reference.

BACKGROUND OF THE INVENTION

1. Field of Invention

The invention relates to an article carrier for a baby carriage. More particularly, the invention relates to an article carrier for baby carriage including a cover sheet that is movably mounted to the article carrier via support rods to retract or deploy and uncover or cover and shield the article carrier.

2. Related Art

A baby carriage is generally used when parents want to take out their baby and not manually carry him or her. However, the parents usually also need to bring some necessary infant articles with them. Sometimes, the baby carriage may also be used as a cart, especially in shopping. Therefore, an article carrier may be attached on the baby carriage for placing articles therein.

Referring to FIG. 1, a conventional baby carriage 1 includes a carriage frame 1 and a cradle 12. An article carrier 14 with an opened accommodating space 13 therein is placed under the cradle 12.

However, an excessive amount of articles or an improper arrangement of the articles in the opened space 12 may cause the articles to drop on the ground.

SUMMARY OF THE INVENTION

An object of the invention is therefore to provide an article carrier for baby carriage that prevents the articles placed in the carrier from dropping on the ground.

In order to achieve the above and other objectives, an article carrier for a baby carriage is provided. The article carrier is suspended at a lower side of a carriage frame of the baby carriage. The article carrier of the invention includes a carrier body, a pair of support rods and a cover sheet. The cover sheet is movably mounted to the article carrier via the support rods so as to be able to retract or deploy to uncover or cover and shield the article carrier. When the cover sheet is deployed, the articles placed in the article carrier are prevented from dropping on the ground. When the cover sheet is retracted, it is easy for the user to access the articles in the article carrier.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description hereafter, which is given only for illustration purposes, and thus should not be construed in limitative way, wherein.

DETAILED DESCRIPTION OF THE INVENTION

Figure 1:
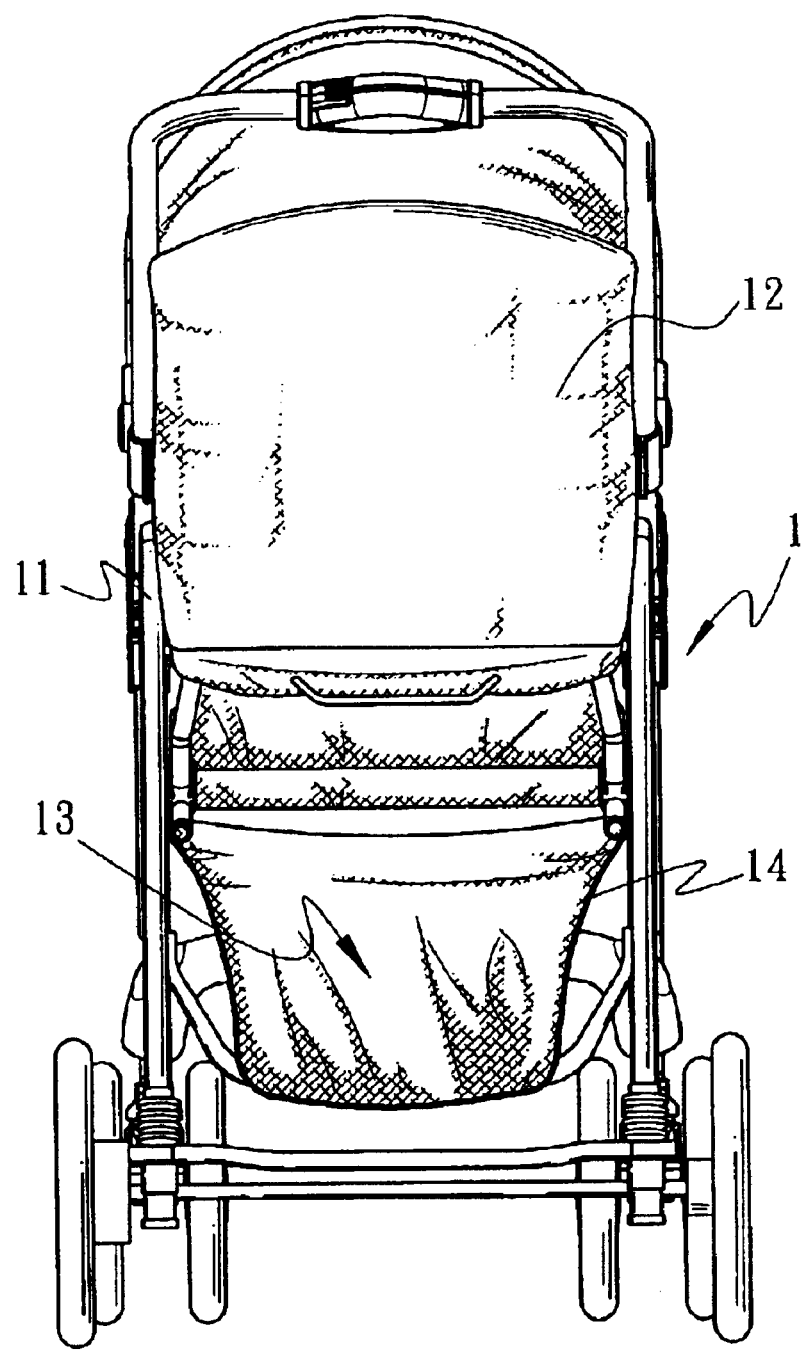
FIG. 1 is a schematic view of a conventional article carrier for a baby carriage.
Figure 2:
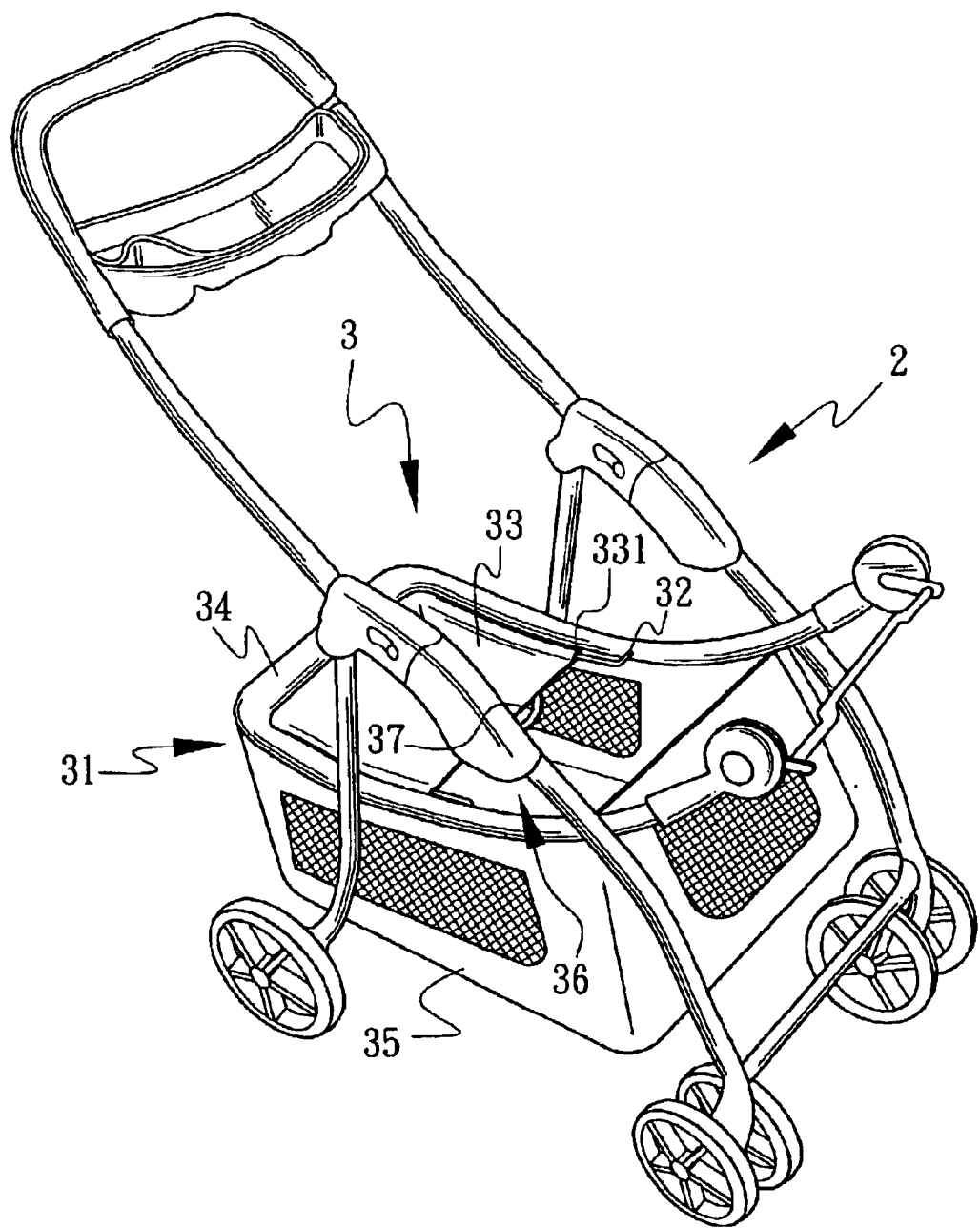
FIG. 2 is a perspective view of an article carrier for a baby carriage according to a first embodiment of the invention.
Figure 3:
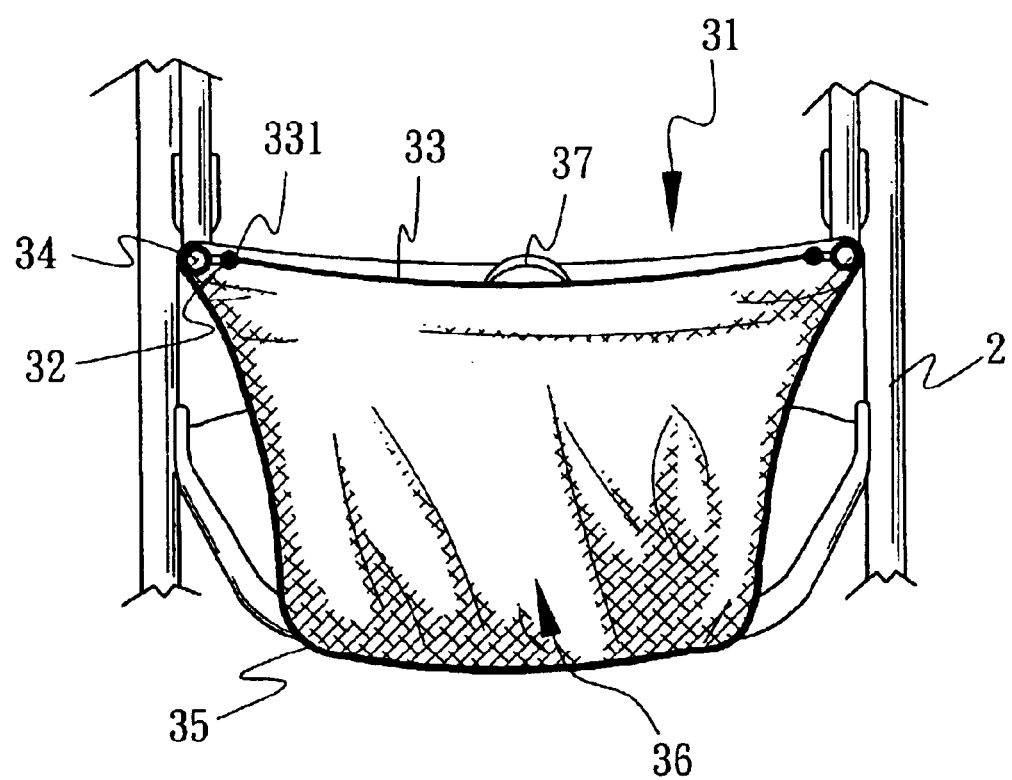
FIG. 3 is a cross-sectional view of an article carrier for a baby carriage according to a first embodiment of the invention.

Referring to FIGS. 2 3, the invention provides an article carrier for a baby carriage. An article carrier 3 of the baby carriage is suspended at a lower side of a carriage frame 2. The carriage frame 2 includes a plurality of legs and links pivotally connected to one another so that the carriage frame 2 is retractable and deployable. A cot, cradle 2 or safety seat (not shown) is typically positioned inside the carriage frame 2 for carrying the baby.

The article carrier 3 includes a carrier body 31, a pair of support rods 32 and a cover sheet 33. The carrier body 31 includes a skeleton 34 covered by a woven cloth 35 or fabric, with an opened top to define an accommodating space 36. The support rods 32 are respectively mounted at the upper edges on opposite inner walls of the skeleton 34. The cover sheet is made by, for example, sewing from woven cloth, fabric or soft material. One vertical side of the cover sheet 33 is attached to the carrier body 31. A sleeve 331 further extends from each of the transverse sides of the cover sheet 33 in which each support rod 32 is inserted, so that the cover sheet 33 is able to either deploy for covering and shielding the article carrier or retract for uncovering the accommodating space 36. The other vertical side of the cover sheet 33 is not bonded to the article carrier and is therefore referred to as a free side. A handle or grip portion is further mounted on the free side of the cover sheet 33 for easy operation of the cover sheet 33.

Figure 4:
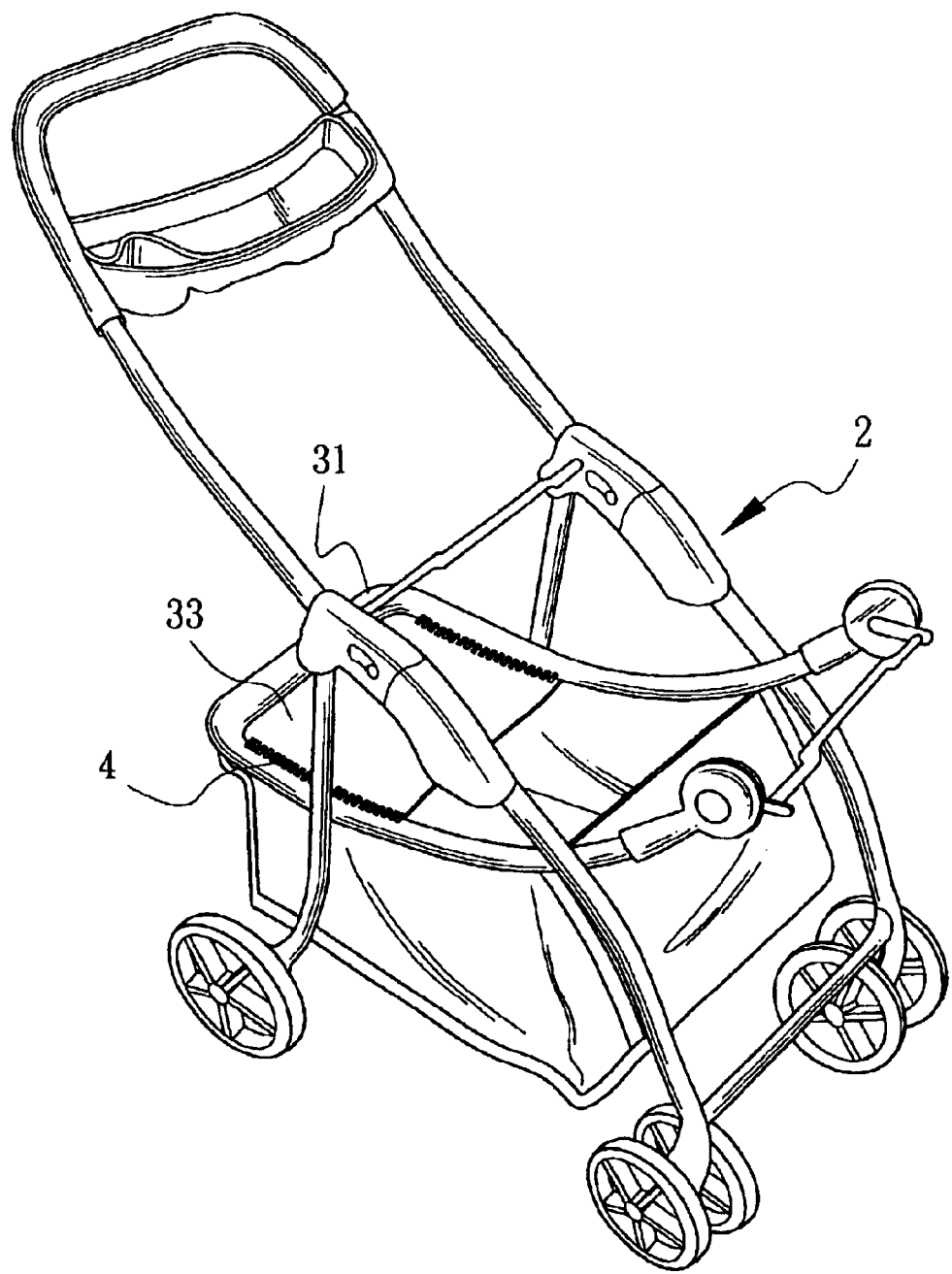
FIG. 4 is a schematic view of an article carrier for a baby carriage according to a second embodiment of the invention.

Referring to FIG. 4, a zipper 4 is optionally mounted at each transverse side of the cover sheet 33 to completely open and close the accommodating space 36.

Figure 5:
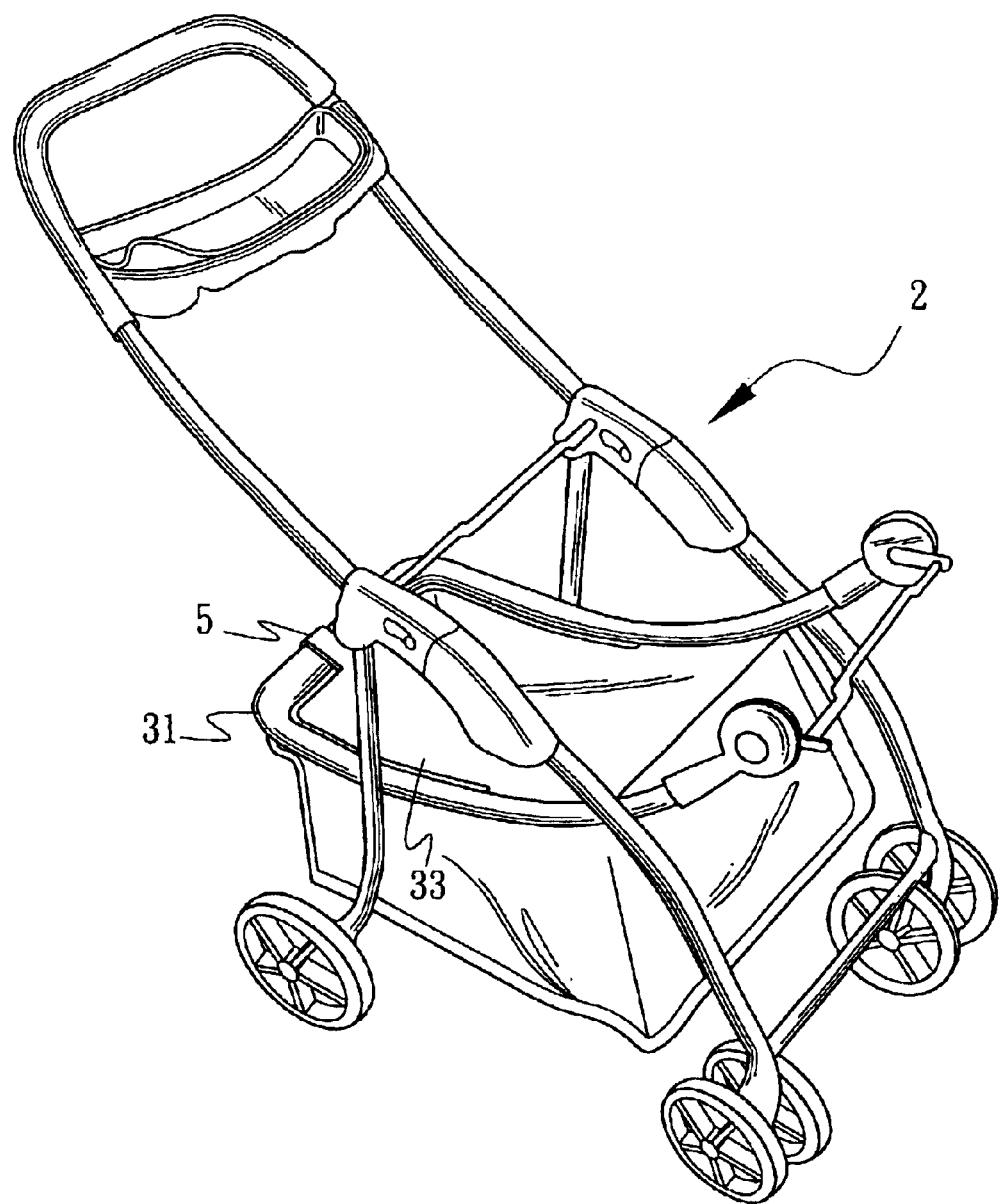
FIG. 5 is a schematic view of an article carrier for a baby carriage according to a third embodiment of the invention.

Referring to FIG. 5, a fastener 5 is further mounted at either side of the cover sheet 33. By fastening the fastener to the carrier body 31, the cover sheet 33 is pulled to close the accommodating space 36.

As described above, one of the characteristics of the invention is that the article carrier for a baby carriage has a cover sheet movably mounted on the accommodating space of the article carrier. The cover sheet is thereby retracted or deployed along the support rods to uncover or cover the accommodating space of the article carrier. Therefore, the articles in the article carrier are prevented from dropping on the ground.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An article carrier for a baby carriage, suspended at a lower side of a carriage frame of the baby carriage, the article carrier comprising:

a carrier body, including a skeleton that is covered by a woven cloth or a fabric, defining an opened top and an accommodating space therein;

a pair of support rods, respectively mounted at upper edges on opposite inner walls of the skeleton; and a cover sheet made of woven cloth, fabric or soft material, wherein the cover sheet is movably mounted to the article carrier via the support rods to uncover or cover the article carrier.

2. The article carrier of claim 1, wherein the cover sheet has a free side by which the cover sheet is retracted or deployed to uncover or cover the article carrier.

3. The article carrier of claim 1, wherein the cover sheet has a free side at which a handle or grip portion is further mounted for easy operation of the cover sheet.

4. The article carrier of claim 1, wherein the cover sheet has a free side at which a fastener is further mounted to fasten the cover sheet to the carrier body.

* * * * *